Dec. 25, 1951  L. DAWLEY  2,579,653
AUXILIARY LIGHT FOR AUTOMOBILES
Filed Sept. 9, 1947  4 Sheets-Sheet 1
Fig. 1.
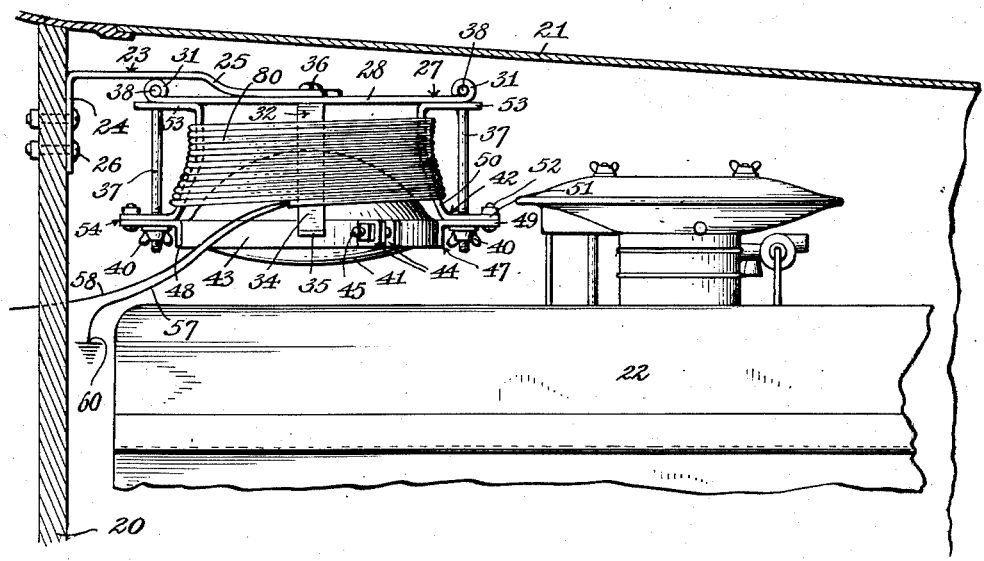
Fig. 2.
Fig. 3.
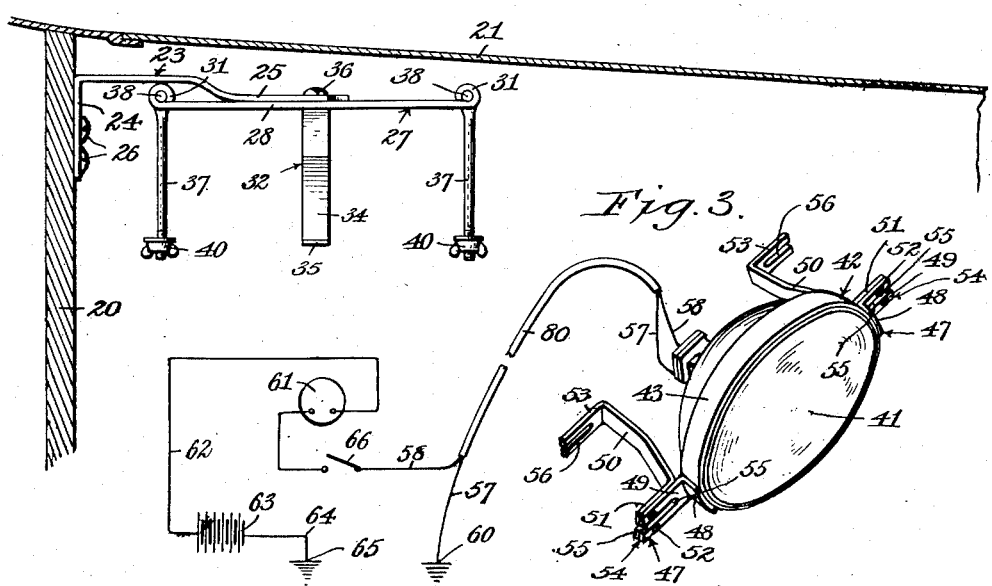
Leonard Dawley, Inventor.
By Emil Kuehbert
Attorney.

Dec. 25, 1951     L. DAWLEY     2,579,653
AUXILIARY LIGHT FOR AUTOMOBILES
Filed Sept. 9, 1947     4 Sheets-Sheet 2

Leonard Dawley
Inventor

Dec. 25, 1951     L. DAWLEY     2,579,653
AUXILIARY LIGHT FOR AUTOMOBILES
Filed Sept. 9, 1947     4 Sheets-Sheet 3
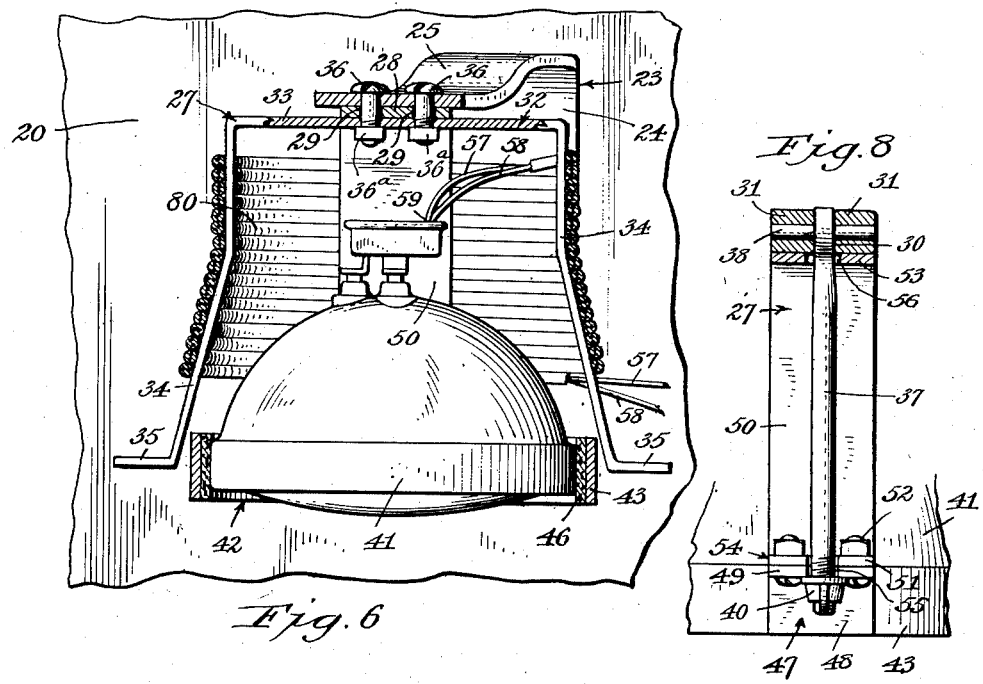
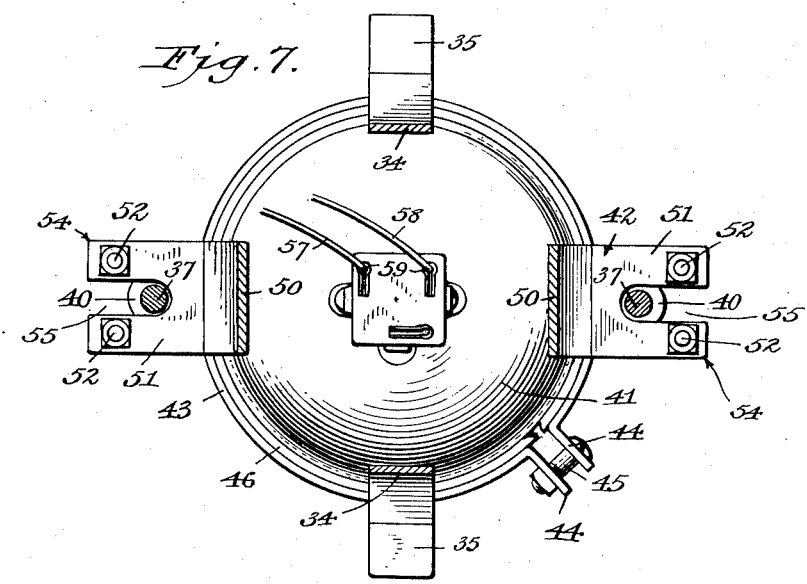
Leonard Dawley
Inventor
By Emil Neuhart
Attorney

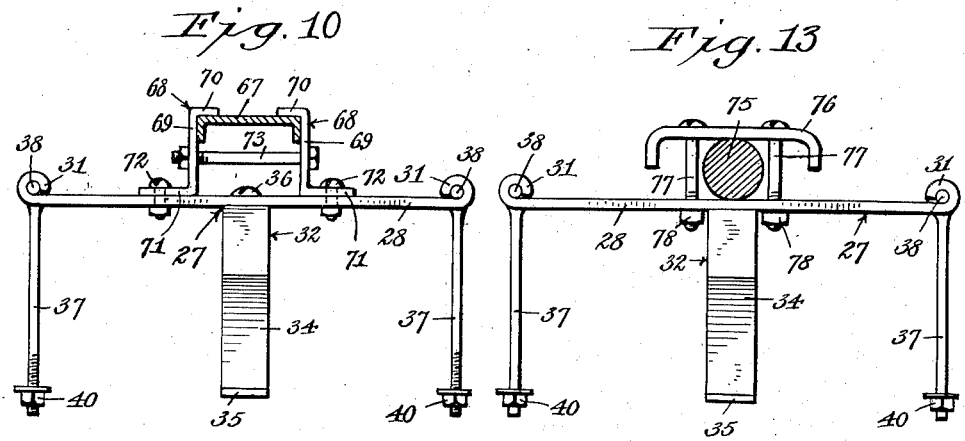
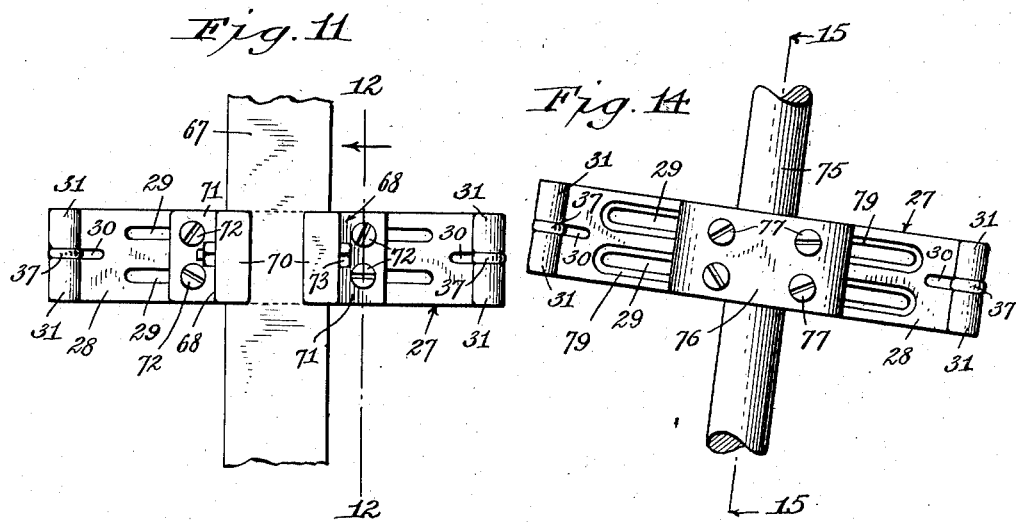
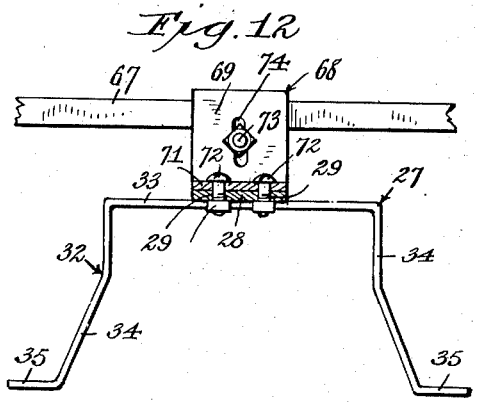
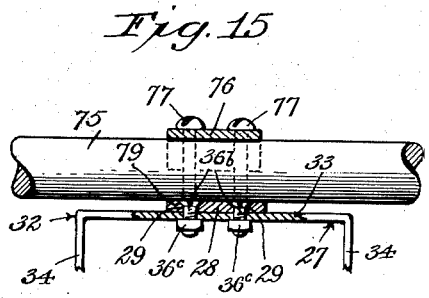

Patented Dec. 25, 1951

2,579,653

UNITED STATES PATENT OFFICE 2,579,653

AUXILIARY LIGHT FOR AUTOMOBILES

Leonard Dawley, Collins, N. Y.

Application September 9, 1947, Serial No. 772,947

7 Claims. (Cl. 240—8.18)

My invention relates to an auxiliary or emergency light designed for use generally with automobiles of various types, but it is particularly adapted for trucks.

One of the objects of my invention is to use a light-unit as an emergency light for purposes not heretofore possible to include under the use of an ordinary flash light, such as commonly resorted to; and with this in view I have provided a sealed-beam light-unit available at all times as a trouble and emergency light and have so arranged the same that the light may be effectively used in emergencies of various kinds, including such as require signals or warnings a distance forward of an automobile which may be stalled, or a distance in rear of the same, The invention also has for an object to so detachably mount and connect the light-unit with the source of electric current utilized for the automobile or truck that in the event of one of the head lights becoming burned out or otherwise failing to function, this improved emergency light-unit may be wired or otherwise fastened to the automobile or truck in front or adjacent to the burned out light so that the automobile may be driven with perfect safety until a new sealed-beam light-unit can be substituted for the unserviceable one.

My invention consists in the novel features of construction and in the arrangement and combination of parts to be hereinafter described, and more particularly pointed out in the subjoined claims.

In the drawings Fig. 1 is a longitudinal sectional view through the portion of a hood enclosing a motor of an automobile and showing the usual dash-board between the driver's area of the automobile and the motor; my invention being shown carried by the dash-board and arranged in a plane above the rear portion of the motor and preferably to one side thereof.

Fig. 2 is a similar view showing the motor omitted and showing only the support or mounting for the sealed-beam light unit and the bracket to which said support or mounting is secured.

Fig. 3 is a detached perspective view of the sealed-beam light-unit, the connector frame or carrier by means of which it is secured to the support or mounting, and diagrammatically showing the current-conducting wires, the connection thereof to the battery, the grounding thereof and the interposition of the ammeter and switch, all to the end that the unit may be lighted independently of the remaining lights of the automobile.

Fig. 4 is a top plan view of my invention showing the same supported from the dash-board of the automobile.

Fig. 5 is a vertical section taken on line 5—5, Fig. 4, looking in the direction of the arrow crossing said line.

Fig. 6 is a vertical section taken on line 6—6, Fig. 5, looking in the direction of the arrow crossing said line, the sealed-beam light-unit and part of the support being shown in elevation.

Fig. 7 is a horizontal section taken on line 7—7, Fig. 5 the current-conducting cord being omitted.

Fig. 8 is a vertical section taken on line 8—8, Fig. 5, looking in the direction of the arrow crossing said line.

Fig. 9 is a cross section through a modified form of ring or annulus forming part of the connector frame or carrier and showing the manner of applying said ring or annulus to the sealed-beam light-unit.

Fig. 10 is a modification of the support or mounting to which the sealed-beam light-unit and its connector frame or carrier is detachably applied.

Fig. 11 is a top plan view of the connector frame or carrier shown in Fig. 10 and the manner in which it is secured to the automobile.

Fig. 12 is a section taken on line 12—12, Fig. 11, looking in the direction of the arrow crossing said line.

Fig. 13 is a side elevation of the support or mounting in still further modified form.

Fig. 14 is a plan view of the same.

Fig. 15 is a section taken on line 15—15, Fig. 14.

Reference being had to the drawings in detail, the numeral 20 designates the dash-board of an automobile, under which term a truck or other motor-driven vehicle is to be included, separating the driver's compartment or region from the motor compartment. 21 represents the hood of the motor compartment, usually movable in sections to enable the motor or other parts within the motor compartment to be easily reached. 22 designates the motor which may be of any design or construction.

My device includes suitable fastening means which may be fastened to a part of the automobile in any approved manner, preferably within the motor compartment underneath the hood 21, and in preferred form I employ a bracket 23 which is formed of heavy strip metal bent into angular formation to provide two arms 24, 25; arm 24 being secured to the dash-board 20 by means of screw-bolts 26 or otherwise, while the arm 25 extends forwardly a suitable distance to secure to its outer or free end a support or mounting 27 having a sealed-beam light-unit fastened thereto, such as used for headlights on automobiles, especially trucks.

The support or mounting comprises a flat member 28, which is also formed of heavy strip metal and provided with two parallel slots 29 along its medial region. Each end of the flat member 28, or header as it may be termed, is provided with a slot 30 midway between its side edges, and the ends of said member or header are curled upon themselves at opposite sides of the slots 30 to form loops or eyes 31.

Applied to the underside of the flat member or header 28 is an inverted substantially U-shaped member 32 comprising a cross piece 33, shown disposed at a right-angle to the flat member or header 28, and depending arms 34, preferably flared along their lower portions and having outstanding terminals or lugs 35 at their lower ends. The said U-shaped member is fastened to the underside of the flat member or header 28 by means of screw-bolts 36 passed through the bracket 23, the parallel slots 29 and through openings formed in the cross piece 33, nuts 36a being applied to the downwardly projecting terminals of said screw-bolts to secure the U-shaped member securely to said flat member or header.

Although the inverted U-shaped member 32 is shown disposed at a right-angle to the flat member or header 28, there are instances where it would be found desirable to have the U-shaped member disposed at a different angle, particularly when the depending arms thereof interfere with parts of the motor or other apparatus underneath the hood. The use of the parallel slots 29 will permit of various angular positions for said U-shaped member.

Pivotally secured to the loops or eyes 31 are depending clamping rods 37 which are formed of round bar material flattened at their upper ends and having openings therein through which openings and the loops or eyes 31 pivots 38 are passed. Normally these clamping rods hang independently from the ends of the flat member or header 28, as clearly shown in Fig. 2, and they have wing or other nuts 40 threaded onto their lower ends, said ends being threaded for a distance upwardly from their terminals.

A sealed-beam light-unit 41 is adapted to be detachably secured to the support 27, and this unit may be of any approved construction, such as used as head lights on passenger cars, trucks and other types of automobiles. The light-unit is attached to a carrier or holder 42 and this carrier or holder includes light-holding element in the form of a split ring or annulus 43 clamped around the light-unit, the ring or annulus where split being provided with outwardly-directed lugs 44 normally spaced apart and having a clamping bolt 45 passed therethrough. In order to assure a secure fastening of the ring or annulus 43 to the light-unit, a ring of felt 46 or other compressible material is interposed between the rim of the light-unit and the split ring or annulus.

Welded or otherwise secured to or formed on said ring or annulus 43, at diametrically opposite points thereof, are fastening elements 47, each formed of flat strip metal bent at a right angle to form a short arm 48 which may be welded or otherwise fastened to the outer side of the split ring or annulus and an outstanding long arm 49. This fastening element may be made integral with the split ring 43, as shown in Fig. 5, and in this modified form these fastening elements 47 are in the form of comparatively long lugs, also designated 49, extending outwardly from the upper marginal portion of the split ring. The said split ring or annulus, which may be referred to as a clamping ring, and the fastening elements 47 form part of fastening means for detachably fastening the light-unit to the support 27, and included in this fastening means to hold the said clamping ring in spaced relation to the flat member or header 28 of the support are what may be termed connector or spacing arms 50. These arms have their lower ends secured to the fastening elements 47 and for this purpose they have outwardly-directed terminals 51, which are bolted to the fastening elements 47, as at 52, so that the clamping ring or annulus 43 and the arms 50 serve as the carrier or holder 42 for the sealed-beam light-unit 41. These arms have outwardly-directed lugs or terminals 53 at their upper ends which are adapted to lie in contact with the under side of the flat member or header 28 forming part of the support 27. The long arms 49 of the fastening elements 47 and the outwardly-directed terminals 51 at the lower ends of the arms 50, which arms are vertically disposed, form outwardly-directed ears 54 at diametrically opposite sides of the clamping ring or annulus 43. The ears 54 are preferably formed of two thicknesses of strip metal to furnish the necessary rigidity desired at this point, and these ears are slotted, as at 55. The outwardly-directed lugs or terminals 53 at the upper ends of the vertically-disposed arms 50 are also slotted, as at 56. With the carrier thus constructed, the clamping rods 37 are passed through the slots 56 of the outwardly-directed lugs or terminals 53, and through the slots 55 of the ears 54 and while holding the carrier with the light-unit against the support 27, the wing or other nuts 40 may be tightened, and when tightened the light-unit will be rigidly secured to the support 27. It will be apparent that the carrier or holder 42 with its light-unit can, therefore, be easily applied to and as readily removed from the support.

Like the depending arms 34 of the inverted U-shaped member 32 forming part of the support or mounting, the vertically disposed arms 50 are flared outwardly along their lower portions, and these arms are utilized in conjunction with the depending arms 34 of said U-shaped member to retain a long length of current-conducting wire 80 for the sealed-beam light-unit.

The current-conducting wire is preferably a duplex wire having two wires 57, 58 passed therethrough and separated from each other where connection is made to parts of the apparatus or parts associated therewith, both wires 57 and 58 being connected to the light-unit, as shown at 59; wire 57 being grounded at the remote or free end of the duplex wire, as at 60, while the wire 58 may be led to the ammeter 61 of the automobile, said ammeter having a wire 62 leading therefrom to the battery of the automobile or truck, indicated at 63, and said battery having a wire 64 leading to the frame of the automobile or truck, or being otherwise grounded, as indicated at 65.

The duplex current-conducting wire is wound around the depending arms 34 of the support 27 and the vertically-disposed arms 50 of the carrier or holder 42, as plainly shown in Figs. 1, 5 and 6, and this can be accomplished in any of various ways; for example, by positioning the carrier or holder in place with the lugs or terminals 53 thereof against the under side of the header 28 after swinging the clamping rods 37 outwardly and upwardly, after which the current conducting wires may be wound around the carrier or holder outside of the depending arms 34 and the connector or spacing arms 50. The clamping rods 37 may then be swung downwardly through the slots 56 in the lugs or terminals 53 of the carrier or holder and into the slots 55 in the ears 54 and the nuts 40 tightened. This may also be accomplished by winding the wire loosely around the connector or spacing arms 50 before attaching the carrier or holder to the support 27 and when positioning the carrier or support in place with the wire loosely wound around the same, the wire so wound may be passed over the depending arms 34 of the support, after which the clamping rods may be tightened in the manner stated. Provision may, of course, be made to wind or coil the wire around the carrier or holder in other ways, if desired.

My improved emergency light will enable the operator of the automobile to use the light-unit by fastening it to the automobile so as to direct rays of light ahead and assure safety in travel in the event the normal lighting system fails, and in the event of a tire becoming deflated, the light-unit can be positioned adjacent the deflated tire so that the operator of the car can exchange the deflated tire for an inflated one. Many other advantages may be had by the use of my improved light.

While I have illustrated a split clamping ring or annulus formed of flat material, I prefer to utilize a modified form of ring or annulus in which the material is transversely concaved interiorly, as shown in Fig. 9, and by placing the clamping ring so formed around the rim of the light-unit, the possibility of the latter, under strain or jarring of the automobile, becoming removed from the clamping ring is entirely eliminated. In this modified form of clamping device, the ring or annulus is designated by the numeral 43a and the ring of felt or other compressible material by the numeral 46a.

In the preferred construction of my invention, I have shown a bracket 23 fastened to the usual dash-board of an automobile or truck and carrying the support for the light-unit, but in some instances trucks are provided with channel bars extending longitudinally underneath the hood covering the motor compartment, and such a channel bar is shown in Figs. 10, 11 and 12 of the drawings and is designated by the numeral 67. A modified form of my approved support will enable the light-unit to be fastened to the channel bar, and for this purpose, spaced apart clamping elements 68 are fastened to the upper side of the flat member or header 28, said clamping members being of Z-formation so as to provide vertical arms 69 having inwardly-directed lugs 70 and outwardly-directed lugs 71. Screw bolts 72 are passed through the outwardly-directed lugs and through the parallel slots 29 in the flat member or header 28, while the inwardly-directed lugs 70 extend over and lie in contact with the upper surface of the channel bar 67.

The clamping elements 68 may have a clamping bolt 73 passed through its vertical arms, but in some instances the screw bolts 72 will be sufficient to guard against detachment of the support or holder from the channel bar. It will be apparent that the channel bar may vary in width and that the clamping elements can be adjusted accordingly, since the screw bolts 72 are adjustable in the parallel slots 29. If desired, the clamping bolt 73 may be vertically adjustable in the vertical arms 69 of the clamping elements and for this purpose each of these vertical arms is provided with a vertical slot 74, through which the clamping bolt is passed.

Some trucks have cylindrical rods, such as shown at 75, extending from the front rearwardly to the body of the truck, and these rods are invariably arranged to converge in a forward direction. These rods are usually at opposite sides of the longitudinal center of the motor compartment and in Figs. 13 to 15 I have shown a support modified in construction and adapted for connection with such rod. In this modification the flat member or header of the support 27 is placed against the underside of the rod and a clip piece 76 applied to the upper side of the rod, said clip piece extending beyond the rod at each side thereof and having screw bolts 77 passed therethrough and through the parallel slots 29 in the flat member or header of the support 27, nuts 78 being applied to the lower ends of said screw bolts and impinging against the underside of said flat member or header. The ends of the clip piece are preferably turned down as shown in Fig. 13.

Screw bolts 36b are employed in said modifications to fasten the inverted U-shaped member 32 to the flat member or header 28, the bolts being countersunk into the latter, as clearly shown in Fig. 15. Nuts 36c are employed to tighten said screw bolts, and for this purpose the slots of said header are chamfered, as at 79 such an arrangement being required due to the fact that the region of the screw bolts are directly underneath the cylindrical rod to which the support is attached.

It will be clear from the foregoing that there are various ways in which my improved support may be fastened in place within an automobile, preferably within the motor compartment of the automobile, also that there may be various ways in which a light-unit may be detachably secured to the support.

Where, in the appended claims, reference is made to an automobile it is intended to include passenger cars, buses, trucks and other types of vehicles in which a source of electric current is provided for causing the motor of the automobile to function and for lighting the conventional lights with which the automobile is equipped.

Having thus described my invention, what I claim is:

1. An emergency light for automobiles, comprising an elongated member having loops at opposite ends, an inverted U-shaped member depending from said elongated member and disposed at an angle thereto, means for attaching said elongated member to a part of the automobile, depending clamping rods pivotally connected at their upper ends to said loops, a light carrier comprising a split annulus having outstanding lugs at diametrically opposite points and spacing members between said annulus and said elongated member having outstanding lugs at their upper ends bearing against the underside of said elongated member and provided with slots through which said clamping rods are passed and lugs at their lower ends, the lugs of said annulus and the lugs at the lower ends of said spacing members being slotted to receive said clamping rods, said clamping rods having their lower ends threaded, nuts applied to said threaded lower ends impinging against the undersides of the lugs of said annulus; a light unit clamped within said annulus, and current-conducting wires connected to said light-unit and wound around said spacing members and said inverted U-shaped member and having connection with the battery of the automobile, said current-conducting wires being connected to the ammeter of the automobile and having a switch therein by means of which said light-unit may be controlled, said current-conducting wires being arranged to be uncoiled from said spacing member and said inverted U-shaped member so that upon loosening said clamping rods said light-unit and light carrier may be moved to any desired position permitted by the uncoiled lengths of said current-conducting wires.

2. An emergency light for automobiles, comprising a support having an elongated member provided with parallel slots along the major portion of its length, a bracket applied to a part of the automobile, screws passed through said bracket and through the slots of said elongated member and having nuts applied thereto to fasten said elongated member to said bracket, clamping rods secured to opposite ends of said elongated member, a carrier having outstanding lugs through which said clamping rods are passed, nuts applied to said clamping rods to secure said carrier to said elongated member, a sealed-beam light-unit secured to said carrier, current-conducting wires connected to said light-unit and receiving electric current from the battery of the automobile, said current-conducting wires being wound around said carrier and adapted to be unwound so as to enable the light unit to be positioned anywhere within the reach of said current-conducting wires when uncoiled, and means for making and breaking the current as desired, independently of the current controlling other lights of the automobile.

3. An emergency light for automobiles in which a channel bar is included within the motor compartment, comprising an elongated member having depending clamping rods at opposite ends, Z-shaped clamping members secured to the upper side of said elongated member and disposed at opposite sides of said channel bar to engage the same at the top and sides thereof, clamping screws passed through said clamping members to clamp the latter to said channel bar, a carrier removably attached to said elongated clamping member by means of said clamping rods, a light-unit secured within said carrier, and current-conducting wires connected to said light-unit and coiled or folded in compact space adjacent the latter in a manner to permit their being extended to reach any distant point of the automobile and thus enable the light-unit to be used at such distant point, said current-conducting wires being in electrical connection with the battery of the automobile.

4. An emergency light for automobiles in which forwardly-converging rods are included within the motor compartment, comprising an elongated member having depending clamping rods at opposite ends, a clip piece overlying one of said forwardly-converging rods and having securing screw bolts passed therethrough and through said elongated member, a carrier removably attached to said elongated clamping member by means of said clamping rods, a light-unit secured within said carrier, and current-conducting wires connected to said light-unit and coiled or folded in compact space adjacent the latter in a manner to permit their being extended to reach any distant point of the automobile and thus enable the light-unit to be used at such distant point, said current-conducting wires being in electrical connection with the battery of the automobile.

5. An emergency light for automobiles in which a channel bar is included within the motor compartment, comprising an elongated member having parallel slots between its end and clamping rods depending from opposite ends thereof, spaced-apart Z-shaped clamp elements having vertical arms lying against opposite sides of said channel bar, inwardly directed lugs bearing against the upper side of said channel bar and outwardly directed lugs bearing against the upper side of said elongated member, screws passed through said outwardly directed lugs and through the parallel slots of said elongated member, nuts applied to said screws and bearing against the underside of said elongated member, said vertical arms having transversely alined vertical slots, a clamping bolt passed through said vertical slots and clamping said clamp elements against said channel bar, a light carrier detachably secured to said elongated member by means of said clamping rods, a light-unit secured to said carrier and detachable therewith from said elongated member, and current-conducting wires connected to said light-unit and normally retained within a small area adjacent said light-unit, said current-conducting wires being capable of extension to reach any desired point within or adjacent the automobile which emergency requires, and means to control the light of said light-unit independently of other lights of the automobile.

6. An emergency light for automobiles, comprising an elongated member, an inverted U-shaped member fastened to and disposed midlength of said elongated member, means for attaching said elongated member to a part of an automobile, clamping rods connected at their upper ends to the ends of said elongated member, a light-carrier to which a sealed-beam light-unit is secured including a light-holding element and spacing members between said light-holding element and said elongated member, said spacing members serving to space said light-holding element the desired distance from said elongated member, said light carrier being detachably supported from said elongated member through the medium of said clamping rods, and current conducting wires connected to said light-unit and adapted to be wound around said spacing members and said inverted U-shaped member and capable of being unwound therefrom so that upon loosening said clamping rods, said light-unit and light-carrier may be moved as a unit to any desired position permitted by the uncoiled limits of said current-conducting wires.

7. An emergency light for automobiles, comprising an elongated member having loops at opposite ends, an inverted U-shaped member depending from said elongated member and disposed at an angle thereto; means for attaching said elongated member to a part of the automobile; depending clamping rods pivotally connected at their upper ends to said loops, a light-carrier having outstanding slotted lugs at its upper end bearing against the under side of said elongated member and a circular light-holding element at its lower end, said clamping rods being passed through the slots of said lugs and having their lower ends secured to said circular light-holding element; a light-unit fastened within said circular light-holding element and current-conducting wires connected to said light-unit, said current-conducting wires being coiled and arranged to be uncoiled so that upon loosening said clamping rods, said light-units and light carrier may be moved as a unit to any desired position permitted by the uncoiled limits of said current conducting wires.

LEONARD DAWLEY.

REFERENCES CITED

The following references are of record in the file of this patent:

UNITED STATES PATENTS

| Number | Name | Date |
| --- | --- | --- |
| 629,291 | Hall et al. | July 18, 1899 |
| 988,930 | Corbett et al. | Apr. 4, 1911 |
| 1,392,441 | Hikonow | Oct. 4, 1921 |
| 1,502,866 | Moore | July 29, 1924 |
| 1,565,660 | Little | Dec. 15, 1925 |
| 1,680,508 | Downing | Aug. 14, 1928 |
| 2,089,850 | Kenney | Aug. 10, 1937 |
| 2,090,611 | Stumpf | Aug. 17, 1937 |
| 2,114,350 | Lee | Apr. 19, 1938 |
| 2,168,118 | Dickson | Aug. 1, 1939 |
| 2,221,295 | Bryk | Nov. 12, 1940 |
| 2,334,900 | Bosten et al. | Nov. 23, 1943 |
| 2,424,719 | Stoeck et al. | July 29, 1947 |
| 2,435,165 | Stelmack | Jan. 27, 1948 |